(12) United States Patent
Malvern et al.

(10) Patent No.: US 8,347,718 B2
(45) Date of Patent: Jan. 8, 2013

(54) ANGULAR VELOCITY SENSORS

(75) Inventors: Alan Richard Malvern, Plymouth (GB); Christopher Paul Fell, Plymouth (GB); Andrew Kazer, Plymouth (GB); Kevin Townsend, Plymouth (GB)

(73) Assignee: Atlantic Inertial Systems Limited, Devon (GB)

( * ) Notice: Subject to any disclaimer, the term of this patent is extended or adjusted under 35 U.S.C. 154(b) by 329 days.

(21) Appl. No.: 12/678,704

(22) PCT Filed: Sep. 8, 2008

(86) PCT No.: PCT/GB2008/050798
§ 371 (c)(1),
(2), (4) Date: Apr. 22, 2010

(87) PCT Pub. No.: WO2009/037499
PCT Pub. Date: Mar. 26, 2009

(65) Prior Publication Data
US 2010/0212424 A1    Aug. 26, 2010

(30) Foreign Application Priority Data

Sep. 18, 2007  (GB) .................................. 0718161.3
Sep. 19, 2007  (EP) .................................. 07253714

(51) Int. Cl.
*G01C 19/56* (2006.01)

(52) U.S. Cl. .................................. 73/504.13; 73/504.12

(58) Field of Classification Search ............... 73/504.12, 73/504.13, 504.02, 504.04, 504.14, 504.15
See application file for complete search history.

(56) References Cited

U.S. PATENT DOCUMENTS

| 4,566,327 A | * | 1/1986 | Rider ............................. 73/510 |
| 5,540,094 A | | 7/1996 | Varnham et al. |
| 5,760,304 A | | 6/1998 | Lynch |
| 7,216,538 B2 | * | 5/2007 | Ito et al. ..................... 73/504.12 |

(Continued)

FOREIGN PATENT DOCUMENTS

EP    0 565 384 A1    10/1993

(Continued)

OTHER PUBLICATIONS

International Search Report of PCT/GB2008/050798 dated Nov. 27, 2008.

(Continued)

*Primary Examiner* — Helen C. Kwok
(74) *Attorney, Agent, or Firm* — Buchanan Ingersoll & Rooney PC (57) ABSTRACT

An angular velocity sensor or gyroscope has a ring and a primary drive transducer arranged to cause the ring to oscillate in a primary mode substantially at the resonant frequency of the primary mode of the ring. A primary control loop receives primary pick-off signals from the primary pick-off transducer and provides primary drive signals to the primary drive transducer so as to maintain resonant oscillation of the ring. The primary control loop includes a demodulator arranged to determine the amplitude of the fundamental frequency of the primary pick-off signals and a demodulator arranged to determine the amplitude of the second harmonic frequency of the primary pick-off signals and a drive signal generator arranged to produce the primary drive signals with an amplitude that is dependent on a ratio of the amplitude of the second harmonic frequency of the primary pick-off signal over the amplitude of the fundamental frequency of the primary pick-off signal as derived by a divider.

20 Claims, 6 Drawing Sheets

U.S. PATENT DOCUMENTS

| | | | | |
|---|---|---|---|---|
| 7,437,253 B2 * | 10/2008 | Shcheglov et al. | ............. | 702/75 |
| 7,805,993 B2 * | 10/2010 | Spahlinger | ................. | 73/504.02 |
| 8,113,051 B2 * | 2/2012 | Matsumoto et al. | ........ | 73/504.12 |
| 2007/0220972 A1 | 9/2007 | Araki et al. | | |

FOREIGN PATENT DOCUMENTS

| | | |
|---|---|---|
| EP | 1 775 551 A1 | 4/2007 |
| EP | 1 808 672 A2 | 7/2007 |
| WO | WO 01/22094 A2 | 3/2001 |
| WO | WO 01/77620 A1 | 10/2001 |
| WO | WO 2005/075939 A1 | 8/2005 |
| WO | WO 2006/006597 A1 | 1/2006 |

OTHER PUBLICATIONS

Written Opinion of the International Searching Authority of PCT/GB2008/050798 dated Nov. 27, 2008.

European Search Report of Application No. EP 07253714.5 dated Aug. 5, 2008.

United Kingdom Search Report of Application No. GB 0718161.3 dated Jan. 15, 2008.

* cited by examiner

ANGULAR VELOCITY SENSORS

FIELD

The present invention relates to an angular velocity sensor, which is particularly, but not exclusively, suitable for use in a capacitive ring type angular velocity sensor constructed using Micro-Electro-Mechanical Systems (MEMS) techniques and a method of generating primary drive signals for an angular velocity sensor.

BACKGROUND

There is a need to extract the maximum possible performance from a Coriolis type angular velocity sensor, also known as a Coriolis type gyroscope, whilst maintaining low costs to construct the angular velocity sensor and maintaining small size characteristics of the sensor.

Figure 1A:
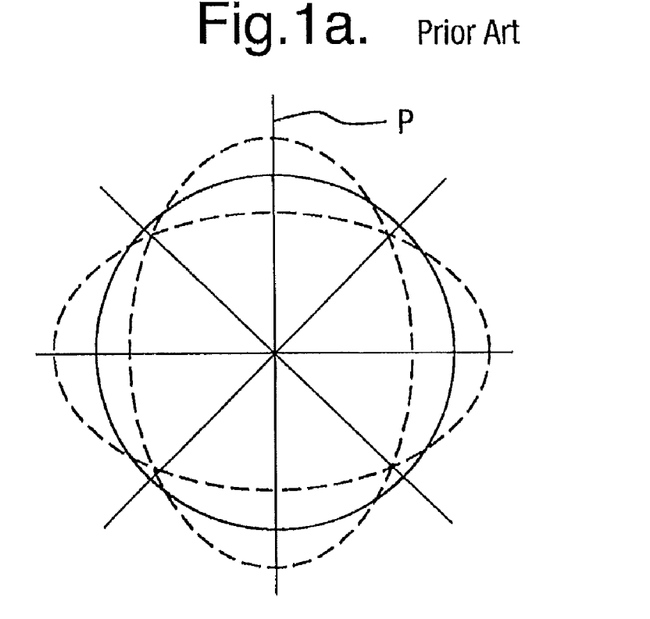
FIG. 1a schematically illustrates the action of radial displacement of a primary carrier vibration mode of a gyroscope ring according to the prior art.
Figure 1B:
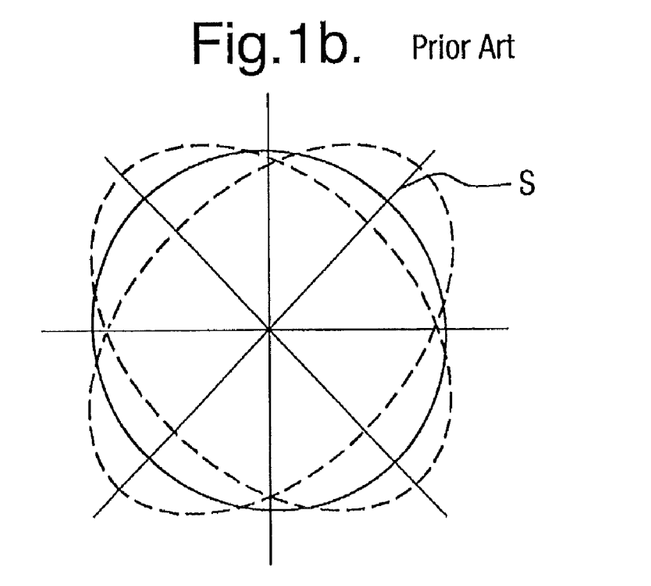
FIG. 1b schematically illustrates the action of radial displacement of a secondary response vibration mode of a gyroscope ring according to the prior art.

The device described in International patent publication number WO2006006597 is an example of a Coriolis type gyroscope formed using MEMS techniques and which is designed to meet the performance requirements of a high volume automotive application. This device operates using a cos 2θ vibration mode pair as described with reference to FIGS. 1a and 1b of WO2006006597, reproduced herein as FIGS. 1a and 1b. In operation, one of these vibration modes is excited as a primary carrier mode as indicated by axis P, the extremities of which are illustrated in FIG. 1a as dashed lines. When the gyroscope is rotated around an axis normal to the plane of a planar silicon ring that forms the gyroscope, Coriolis forces are generated which couple energy into the other vibration mode as indicated by axis S, that is a secondary response mode, the extremities of which are illustrated in FIG. 1b as dashed lines. The amplitude of the induced motion in the secondary response mode will be directly proportional to the applied rotation rate which acts on the gyroscope.

Such a gyroscope will typically be operated in a closed loop mode. In this mode, the primary carrier mode P is driven at the resonance maximum by a primary drive transducer connected to a Phase Locked Loop and the amplitude of motion is substantially maintained at a constant value using an associated Automatic Gain Control loop. The Automatic Gain Control loop is arranged to compare the amplitude of motion, as measured at a primary pick-off transducer, to a fixed reference level, and to dynamically adjust the drive level of the primary drive transducer to maintain a constant signal level and hence a constant amplitude of motion.

The Coriolis force will induce motion in the secondary response mode S, which is detected using a secondary pick-off transducer and in a closed loop operating mode such motion is substantially nulled by means of a secondary drive transducer. It will be understood that the value of the drive force generated by the secondary drive transducer to maintain the null is a direct indication of the applied rotation rate due to Coriolis force acting on the gyroscope.

Devices utilising planar silicon ring structures, typically require that the cos 2θ vibration mode frequencies, i.e. the frequencies of the primary carrier mode and the secondary response mode, are accurately matched. This gives maximum sensitivity as the motion induced by a Coriolis force is amplified by the quality factor of the secondary response mode. Amplification by the quality factor of the secondary response mode can be of the order of several thousands. MEMS fabrication processes are capable of producing planar silicon ring structures to a high degree of accuracy. However, small imperfections in the geometry of such a structure will typically give rise to a small residual frequency split between the primary carrier and secondary response mode frequencies. For the device described in International patent publication number WO2006006597, this frequency split can be compensated for during operation of the device by the use of additional transducers, similar in construction to the drive transducers and pick-off transducers that are arranged externally to the planar ring structure. Each additional transducer is positioned internally of the planar ring structure. Accordingly, when a direct current (DC) signal offset is applied between a capacitor plate of an additional transducer and the planar silicon ring, an electrostatic force is generated that acts as a negative spring and allows the stiffness of the planar silicon ring to be locally adjusted. Therefore, the vibration mode frequencies can be differentially adjusted using such additional transducers to ensure that the vibration mode frequencies are accurately matched.

Figure 2:
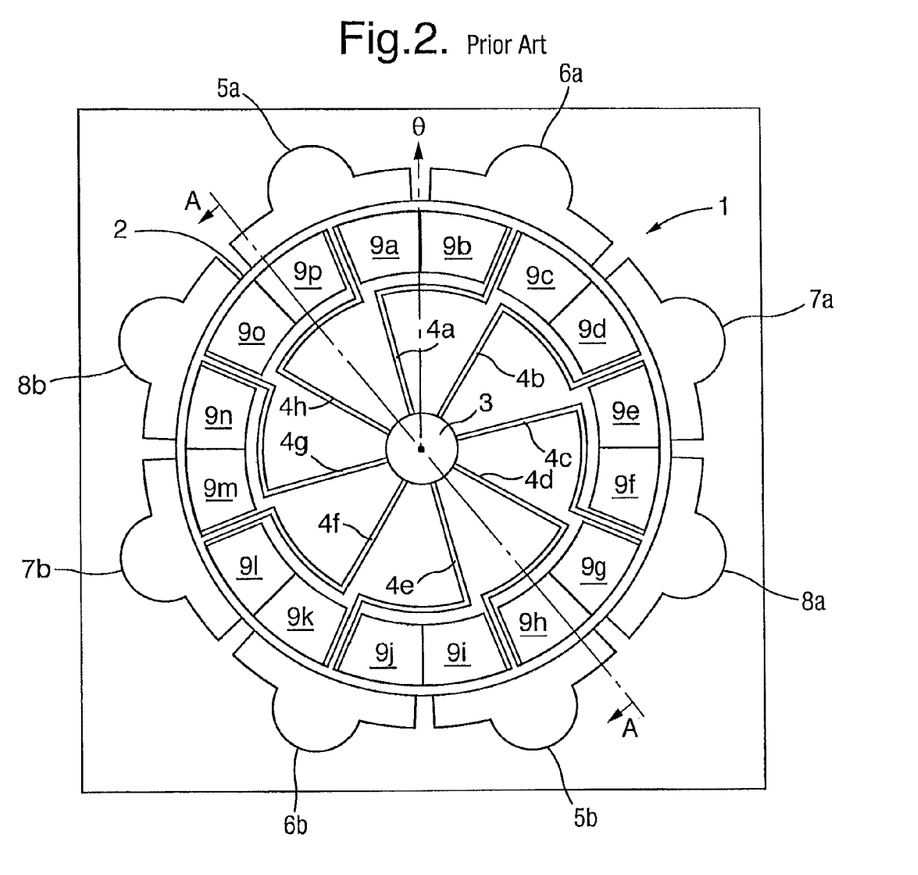
FIG. 2 is a plan view of a ring structure and capacitor plate configuration of a ring gyroscope according to the prior art.

Referring to FIG. 2, a gyroscope structure 1 as described in International patent publication number WO2006006597 has a ring structure 2 supported from a central hub 3 by eight compliant support legs 4a to 4h. Drive transducers 5a, 5b, 6a and 6b and pick-off transducers 7a, 7b, 8a and 8b are all located around the outer circumference of the ring structure 2 and are each spaced from the ring structure 2 to create a capacitive gap. In closed loop operation, two opposed primary drive transducers 5a and 5b are used to excite the primary motion of the ring structure 2. Excited primary motion is detected by two opposed primary pick-off transducers 7a and 7b. Coriolis induced motion of the ring structure 2 is detected using two opposed secondary pick-off transducers 8a and 8b and such Coriolis induced motion is nulled using two opposed secondary drive transducers 6a and 6b. The gyroscope structure 1 includes sixteen capacitor plates 9a to 9p that are all located within the ring structure 2 and are each spaced from the ring structure 2 to create a capacitive gap. Each capacitor plate 9a to 9p is arranged to generate a predetermined electrostatic force that acts upon the ring structure 2 to locally adjust the stiffness of the ring structure 2.

Figure 3:
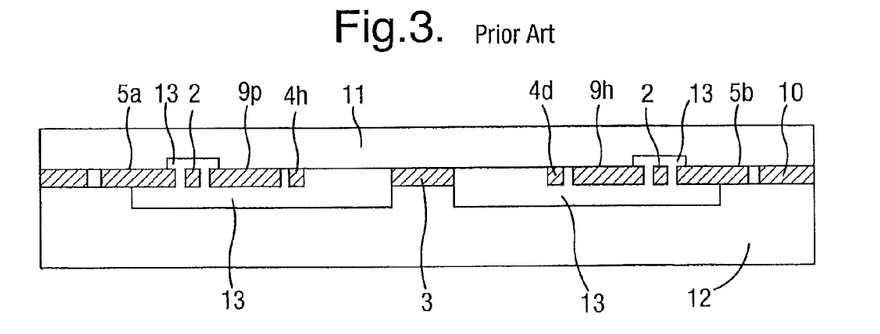
FIG. 3 is a cross-sectional view of a prior art ring gyroscope of along sectional line A-A of FIG. 2, illustrating a supported glass structure and capacitor plate configuration of the gyroscope according to the prior art.

Referring to FIG. 3, in which like references have been used to indicate similar integers to those illustrated in FIG. 2, the ring structure 2 of the gyroscope structure 1 is formed in a layer 10, which is fabricated from bulk crystalline silicon. The ring structure 2 is supported from the central hub 3 and the central hub 3 is anodically bonded to glass support layers 11 and 12 adjacent to layer 10. Glass support layers 11 and 12 are typically fabricated from Pyrex®. Capacitor plates 9h and 9p, which are also fabricated from crystalline silicon, are directly bonded to the glass support layer 11. Support legs 4d and 4h support the ring structure 2 from the central hub 3.

This glass to silicon to glass sandwich formation provides a hermetic device and is assembled with a low pressure gas, for example 10 mTorr (1.33322 Pa), within the spaces defined by layer 10 and one or more cavity regions 13 within the glass support layers 11 and 12 to enable the ring structure 2 to resonate with a high quality factor, typically in the order of 10,000 to 100,000. Silicon material is used to manufacture the ring structure 2, central hub 3, support legs 4a to 4h, drive transducers 5a, 5b, 6a and 6b, pick-off transducers 7a, 7b, 8a and 8b and capacitor plates 9a to 9p as it is inexpensive, readily available and enables simple etching to fabricate such components.

The amplitude of motion of the ring structure 2 is set to be several microns. Accordingly, in operation, the annular ring structure 2 forms successive prolate and oblate elliptical shapes along the drive direction.

Figure 4:
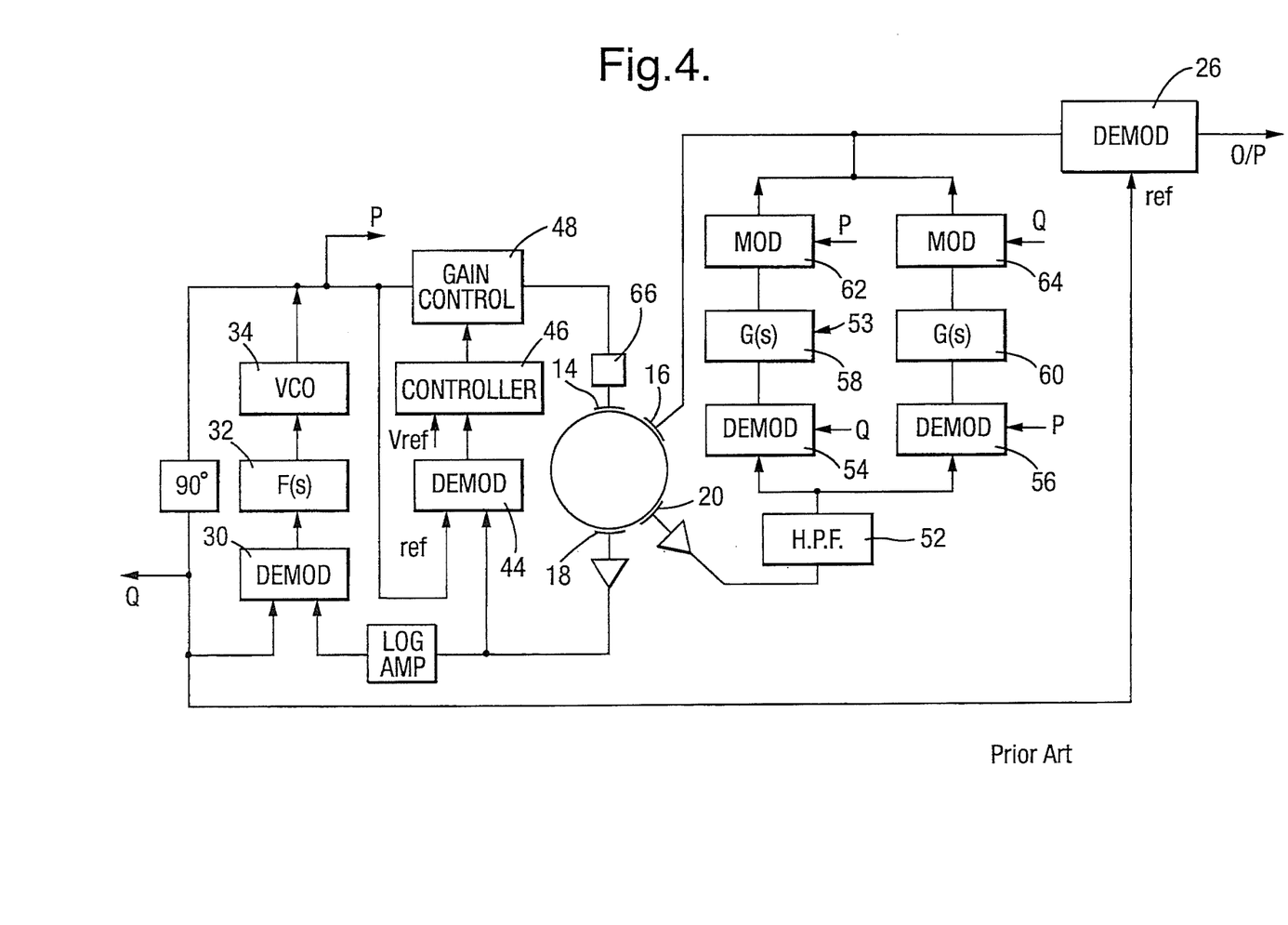
FIG. 4 is a schematic circuit diagram of control electronics for a resonant structure according to the prior art.

Referring to FIG. 4, a primary control loop for a sensor comprising a resonant structure, as described in European patent publication number EP0565384, includes a primary control loop arranged between a primary pick-off electrode 18 and a primary drive electrode 14 and is used to drive the resonant structure in a primary mode at the resonant frequency of the resonant structure. A voltage controlled oscillator 34 is used to drive the resonant structure and a gain control 48 allows the amplitude of the drive signal applied to drive electrode 14 to be varied in response to a control signal generated by a controller 46. The output of the primary pick-off 18 is demodulated by demodulator 30 of a frequency loop portion of the primary control loop using the voltage controlled oscillator 34 output frequency as a reference, but phase shifted by 90°. A loop filter F(s) 32 is arranged to provide closed loop stability at the operating point of the resonant structure and the output of the loop filter F(s) 32 is connected to the voltage controlled oscillator 34. A second demodulator 44 of a gain control loop portion of the primary control loop utilizes the output of the voltage controlled oscillator 34 as a reference to demodulate the output of the primary pick-off 18. The demodulated output of demodulator 44 is fed to the controller 46 which is arranged to compare the demodulated output with a reference voltage $V_{ref}$. The difference between the demodulated output from the demodulator 44 and the reference voltage $V_{ref}$ is used as an error signal which is feed to the gain control 48. It will be understood that the output of the controller 46, the error signal, sets the amplitude of motion generated by the primary drive electrode 14 so as to maintain the primary pick-off signal from the primary pick-off electrode 18 at a fixed level, as set by the value of the reference voltage $V_{ref}$. Thus the primary motion of the resonant structure is set by two parts of the primary control loop, first the frequency loop of the primary control loop sets the primary pick-off signal to be 90° out of phase with the voltage controlled oscillator 34 and thereby sets the resonant structure to operate at resonance and second the gain control loop of the primary control loop sets the primary pick-off signal to a fixed value to stabilize the amplitude of motion of the resonant structure.

A secondary control loop is used to sense a secondary mode at the primary resonant frequency of the resonant structure. The secondary mode is due to motion of the resonant structure under the influence of angular rotation of the resonant structure, i.e. the Coriolis effect. Such motion is detected at 45° with respect to the primary mode of the resonant structure and is proportional to the applied rate of rotation. The secondary control loop is arranged between a secondary pick-off electrode 20 and a secondary drive electrode 16 and generates an applied force feedback at the resonant frequency to null the secondary mode. Accordingly, the amplitude of a signal applied to the secondary drive electrode 16 will be proportional to the applied rate of rotation of the resonant structure. A benefit of the secondary control loop is that the bandwidth of the sensor is set by the closed secondary control loop rather than by the quality factor of the resonant structure.

The secondary control loop includes two demodulators, a first demodulator 54 with a quadrature phase reference input and a second demodulator 56 with an in-phase reference input. Each demodulators 54, 56 is arranged to demodulate secondary pick-off signals received from the secondary pick-off electrode 20 with its respective reference input and to produce demodulated outputs. The demodulated outputs of the demodulators 54 and 56 are feed into regulators G(s) 58 and 60, respectively. Regulators G(s) 58 and 60 are arranged to maintain the stability of the closed secondary loop and produce outputs which are then modulated by modulators 62 and 64 respectively. Modulator 62 has an in-phase reference input and modulator 64 has a quadrature phase reference input. Each modulator 62 and 64 is arranged to modulate the outputs of the regulators G(s) 58 and 60 with its respective reference input and to produce modulated outputs. The combined modulated outputs of modulators 62 and 64 supply a signal that is applied to the secondary drive electrode 16 to null motion detected by the secondary pick-off electrode 20.

Accordingly, the secondary control loop is formed of two parts, a quadrature-phase loop comprising demodulator 56, regulator G(s) 60 and modulator 64 and an in-phase loop comprising demodulator 54, regulator G(s) 58 and modulator 62. A quadrature signal arises due to the difference between the primary and secondary modes and is not rate sensitive. Whereas, the in-phase signal is a rate sensitive signal. Thus the signal applied to the secondary drive transducer 16 has both in-phase and quadrature components.

The rate of rotation applied to the resonant structure is determined by demodulating the combined modulated output for the modulators 62 and 64 in demodulator 26 with the same reference signal derived from the voltage controlled oscillator 34 of the primary loop phase shifted by 90°.

As illustrated in FIG. 4, the primary pick-off electrode and the secondary pick-off electrode are coupled to the primary control loop and the secondary control loop, respectively, via charge amplifiers. A high pass filter 52 is used to suppress noise in the secondary control loop, which requires a high level of gain to achieve a good level of sensitivity.

However, the prior art as typified by that described with reference to FIGS. 1a to 4 suffers from a charge trapping effect.

The scale factor of a capacitive type ring gyroscope depends on the $4^{th}$ power of the gap $d_E$ defined between a ring and its associated drive and pick-off transducers, the scale factor SF being expressed as:

$$SF \propto \frac{1}{G_{SD}G_{PPO}} \frac{1}{HT^2} \frac{d_E^4}{(\varepsilon_0 A)^2} C_f V_{AGC}$$

Accordingly, the scale factor SF varies with the inverse square of an applied DC voltage HT to the ring as well as the fourth power of the gap $d_E$. The scale factor SF is defined as the secondary drive voltage required to null a particular rate in degrees per second. $C_f$ is the feedback capacitance of a charge amplifier, A is the area of a capacitor plate, $\varepsilon_0$ is the permitivity of free space and $V_{AGC}$ is the voltage supplied by an automatic gain controller. $G_{SD}$ and $G_{PPO}$ are the gains of the secondary drive and primary pick-off transducers.

A typical capacitor gap $d_E$ is approximately 10 micrometres for a ring diameter of 8 millimeters and a typical DC voltage HT for a high performance ring gyroscope is about 50 volts. At such a DC voltage HT a phenomenon of charge trapping occurs. This manifests itself as a reduction in the scale factor SF and can amount to approximately a 1% reduction in scale factor SF over a period of days if a gyroscope is maintained at a temperature of 85° C. from switch on. A reduction in scale factor SF implies that the effective gap $d_E$ has reduced and/or the DC voltage HT has increased. A high performance ring gyroscope needs to provide a scale factor SF accuracy of better than 0.1% to be of commercial value. Accordingly, the charge trapping phenomenon gives rise to an unacceptable error. The effect of charge trapping can be thought of as either a change in the gap $d_E$, and/or a change in the effective DC voltage HT. For example, a change in the scale factor SF of 1% corresponds to a gap $d_E$ change of 25 nanometres.

It is also known that switching the DC voltage HT off, and leaving the gyroscope at a temperature of 85° C. over a period of time, resets the charge trapping effect. Thus there is hysteresis effect in the scale factor SF due to charge trapping that makes it difficult to apply compensation, as such compensation will be history dependent.

Also, the offset bias of the ring gyroscope needs to be better than 10 degrees per hour for a high performance tactical grade device. There is an offset bias change which accompanies the scale factor SF change, so stabilisation of the scale factor SF will also benefit offset bias stability of the ring gyroscope. The offset bias stability can be thought of as being due to the anisotropy of the scale factor SF change. Accordingly, compensation for such changes in offset bias is difficult to achieve.

The inventor has been appreciate that the charge trapping effect is due to impurity trapping sites within the silicon lattice used to form the ring gyroscope. For a MEMS type gyroscope it is usual to employ highly doped high purity silicon. The high level of doping provides a low resistivity of typically 0.03 ohms per centimeter. Under the application of a DC voltage HT, a depletion zone is created near to the surface of the gap $d_E$. The depletion zone occurs very rapidly after application of the DC voltage HT, and is related to establishing a new state of equilibrium. Minority species with the silicon can be swept into this depletion zone and trapped at impurity sites. This has the effect of reducing the effective gap $d_E$. The rate at which this occurs is dependent on the DC voltage HT and the magnitude of the change is dependent on the impurity level at the impurity sites.

An Automatic Gain Controller (AGC) is arranged to give a fixed level of primary pick-off voltage, as discussed above with reference to FIG. 4. The amplitude of motion of the ring is related to the primary pick-off voltage through the transducer gain of the pick-off transducer. If the transducer gain changes, then the amplitude of motion changes even with a fixed AGC set level. The transducer gain in this case is set by the capacitance of gap $d_E$ and the DC voltage HT. Thus if the capacitance changes, by a change in the effective gap $d_E$, the amplitude of motion changes. As the scale factor SF of the gyroscope is proportional to the amplitude of motion, changes in the amplitude of motion will cause a change in scale factor SF.

Accordingly, charge trapping is an important error for capacitive based sensors, including ring gyroscopes, that rely on a DC bias voltage HT. The DC bias voltage HT has the benefit of increasing the gain of both the drive and pick-off transducers and to linearise the response. Thus the output force is proportional to an applied alternating current (AC) signal in the presence of the DC bias, where normally the electrostatic force is a quadratic function of the AC signal. Also the pick-off signal appears at the resonance frequency.

Schemes which do not use a DC bias are possible, such as AC biasing, but this is a more complicated scheme which is difficult to implement. The AC bias is a means of eliminating the effects of charge trapping as there is never a steady field in which charge carriers can drift. One example of AC biasing is described in U.S. Pat. No. 5,760,304, in which the DC and AC signals are replaced by two AC signals at different frequencies, such that the difference frequency equals the resonant ring frequency.

Alternatively, a lower voltage scheme as described in International patent publication number WO0122094 can be used with a comb type drive transducer rather than the parallel plate capacitor type drive transducer of the ring gyroscope described with reference to FIGS. 2, 3 and 4. However, it is difficult to implement comb type drive transducers and/or pick-off transducers with a ring type gyroscope due to the presence of both radial and tangential motion of the ring.

SUMMARY

According to one aspect of the invention, an angular velocity sensor includes: a semiconductor substrate; a ring structure arranged to vibrate; a support arranged to support the ring structure relative to the semiconductor substrate; at least one primary drive transducer arranged to cause the ring structure to oscillate in a primary mode substantially at the resonant frequency of the primary mode; at least one primary pick-off transducer arranged to detect oscillation of the ring structure in the primary mode; a primary control loop arranged to receive primary pick-off signals from the at least one primary pick-off transducer and provide primary drive signals to the at least one primary drive transducer to maintain resonant oscillation of the ring structure; and wherein the primary control loop includes a first means arranged to determine the amplitude of the fundamental frequency of the primary pick-off signals and a second means arranged to determine the amplitude of the second harmonic frequency of the primary pick-off signals and a drive signal generator arranged to produce the primary drive signals with amplitude that is dependent on a ratio of the amplitude of the second harmonic frequency of the primary pick-off signal over the amplitude of the fundamental frequency of the primary pick-off signal. That is, the primary drive signals is derived from a ratio $2f/1f$.

The drive signal generator may be arranged to produce the primary drive signals with amplitude that is dependent on a ratio of the second power of the amplitude of the second harmonic frequency of the primary pick-off signal over and the third power of the amplitude of the fundamental frequency of the primary pick-off signal. That is, the primary drive signals is derived from a ratio $2f^2/1f^3$.

At least one secondary pick-off transducer may be arranged to detect oscillation of a secondary mode induced when angular velocity is applied around as axis substantially perpendicular to the ring structure. At least one secondary drive transducer may be in a closed loop with the secondary pick-off transducer and wherein the secondary drive transducer may be arranged to null the induced secondary mode oscillation.

The primary control loop may include a demodulator connected to a voltage controlled oscillator, wherein the demodulator may be arranged to produce a demodulated output from the amplitude of the fundamental frequency of the primary pick-off signals with in-phase reference signals and the voltage controlled oscillator may be arranged to generate in-phase reference signals, quadrature phase reference signals and second harmonic frequency reference signals from the demodulated output.

The first means of the primary control loop may include a demodulator arranged to demodulate the primary pick-off signals with quadrature phase reference signals to produce the amplitude of the fundamental frequency of the primary pick-off signals. The second means of the primary control loop may include a demodulator arranged to demodulate the primary pick-off signals with second harmonic frequency reference signals to produce the amplitude of the second harmonic frequency of the primary pick-off signals.

The drive signal generator may include a modulator connected to a voltage amplifier, wherein the modulator may be arranged to produce a modulated output from the ratio of the amplitude of the second harmonic frequency of the primary pick-off signal over the amplitude of the fundamental frequency of the primary pick-off signal with the in-phase reference signals and the voltage amplifier may be arranged to amplify the modulated output to produce the primary drive signals.

The ring structure may be a planar structure and the semiconductor substrate, ring structure and support may be substantially co-planar with one another.

The angular velocity sensor may include at least one oscillation frequency adjusting transducer and an associated voltage source arranged to apply a voltage between at the least one oscillation frequency adjusting transducer and the ring structure to generate an electrostatic force between the oscillation frequency adjusting transducer and the ring structure to differentially adjust the frequencies of the primary and secondary modes to reduce the difference between the frequencies of the primary and secondary modes.

The primary and secondary drive transducers, the primary and secondary pick-off transducers and the oscillation frequency adjusting transducers may be substantially co-planar with one another and substantially co-planar with the semiconductor substrate. The semiconductor substrate, ring structure, support, primary and secondary drive transducers, the primary and secondary pick-off transducers and the oscillation frequency adjusting transducers may be formed from a silicon material.

The support may include two or more radially compliant legs, each leg being supported at one end from a central hub of the semiconductor substrate located internally of the ring structure and each leg connected at the other end to the internal periphery of the ring structure. Alternatively, the support may include two or more radially compliant legs, each leg being supported at one end from the semiconductor substrate externally of the ring structure and each leg connected at the other end to the external periphery of the ring structure.

The semiconductor substrate may be sealed between two support substrates to form a sealed cavity encapsulating the ring structure, the support, the primary and secondary drive transducers, the primary and secondary pick-off transducers and the oscillation frequency adjusting transducers. The support, the primary and secondary drive transducers, primary and secondary pick-off transducers and the oscillation frequency adjusting transducers may be each carried by one of the two support substrates.

According to another aspect of the invention, a method of generating primary drive signals for an angular velocity sensor includes determining the amplitude of the fundamental frequency of a primary pick-off signal, determining the amplitude of the second harmonic frequency of the primary pick-off signal and generating primary drive signals having an amplitude dependent on a ratio of the amplitude of the second harmonic frequency of the primary pick-off signal over the amplitude of the fundamental frequency of the primary pick-off signal. That is, the primary drive signals is derived from a ratio $2f/1f$.

DESCRIPTION OF THE DRAWINGS

The method may include generating primary drive signals having an amplitude dependent on a ratio of the second power of the amplitude of the second harmonic frequency of the primary pick-off signal over and the third power of the amplitude of the fundamental frequency of the primary pick-off signal. That is, the primary drive signals is derived from a ratio $2f^2/1f^3$.

The invention will now be described, by way of example only, with reference to the accompanying drawings, in which.

DETAILED DESCRIPTION

Figure 5:
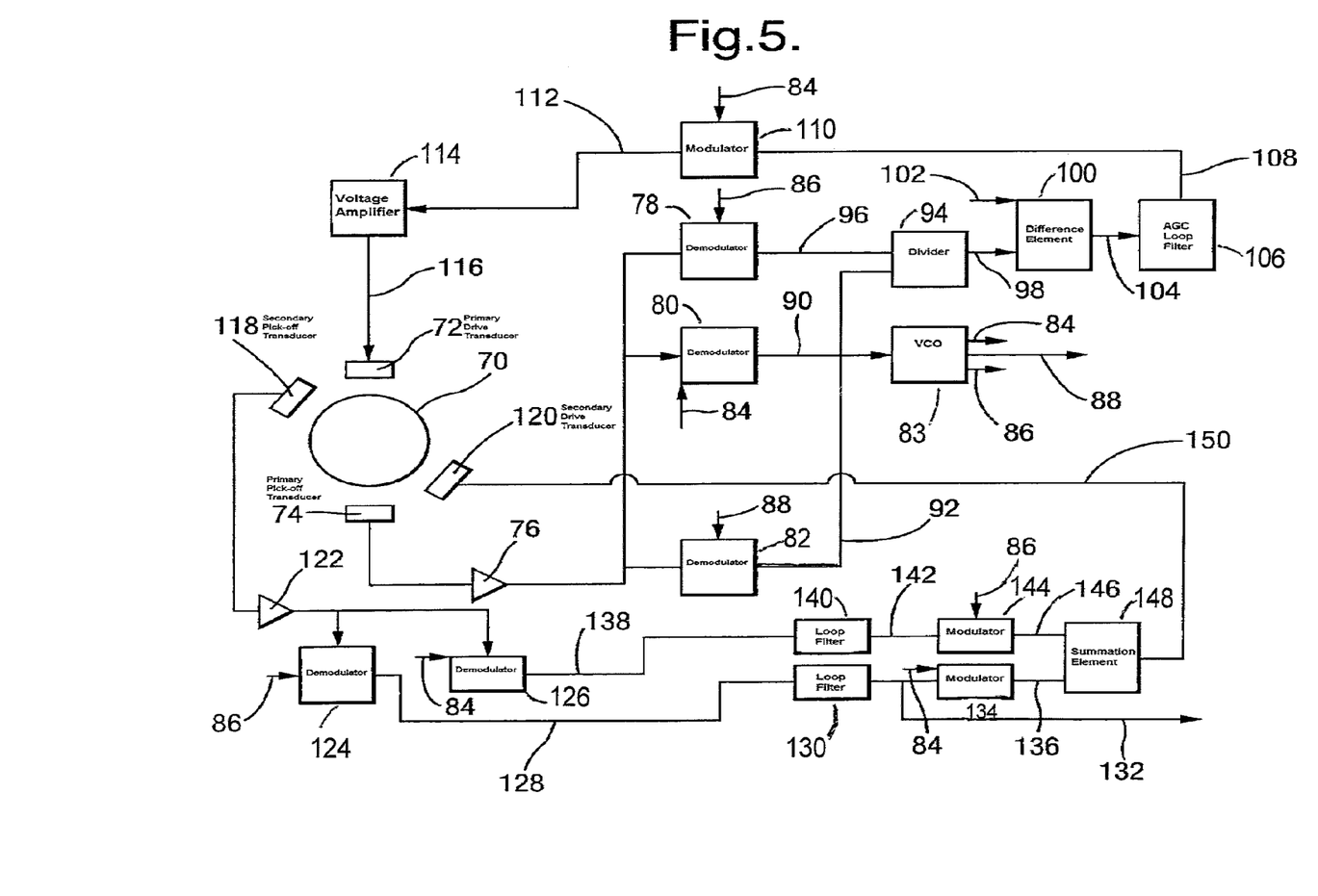
FIG. 5 is a schematic circuit diagram of an angular velocity sensor according to the present invention.

Referring to FIG. 5, a capacitive type angular velocity sensor, also known as a gyroscope, includes a ring 70 arranged to resonate at its resonant frequency. Resonance of the ring 70 is determined by a primary drive transducer 72, which acts in a primary feedback loop with a primary pick-off transducer 74 to maintain a constant amplitude of motion of the ring 70. In operation, the primary pick-off transducer 74 detects resonance of the ring 70 and produces signals that are fed to a charge amplifier 76. The output of the charge amplifier 76 is fed to three demodulators 78, 80 and 82.

Demodulator 80 is connected to a voltage controlled oscillator 83 which produces in-phase reference signals 84, quadrature phase reference signals 86 and second harmonic reference signals 88 for other elements of the angular velocity sensor, as described below. Demodulator 80 is arranged to demodulate the primary pick-off signals received from the charge amplifier 76 with the in-phase reference signals 84 to produce a demodulate signal 90 which is fed to the voltage controlled oscillator 83. The voltage controlled oscillator 83 is arranged to generate in-phase reference signals 84, quadrature phase reference signals 86 and second harmonic reference signals 88.

Demodulator 82 is arranged to receive primary pick-off signals from the charge amplifier 76 and to demodulate the primary pick-off signals with the second harmonic reference signals 88 to provide an output signal 92 which is applied to a first input of a divider 94.

Demodulator 78 is arranged to receive primary pick-off signals from the charge amplifier 76 and to demodulate the primary pick-off signals with the quadrature phase reference signals 86 and to generate an output signal 96 which is applied to a second input of the divider 94.

The divider 94 is arranged to divide the output signal 92 provided by the demodulator 82 by the output signal 96 provided by the demodulator 78. It will be understood that the output signal 96 corresponds to the fundamental frequency of the primary pick-off signal and that the output signal 92 corresponds to the second harmonic frequency of the primary pick-off signals. The divider 94 generates an output signal 98 which is fed to a difference element 100 which is arranged to difference the output signal 98 with a voltage reference 102. A difference signal 104 is produced at an output of the difference element 100 and is fed to an automatic gain control (AGC) loop filter 106 arranged to maintain the stability of the closed primary feedback loop between the primary pick-off transducer 74 and the primary drive transducer 72.

An output signal 108 of the AGC loop filter is fed to a modulator 110 arranged to modulate the output signal 108 with the in-phase reference signals 84 to generate a modulated output 112. The modulated output 112 is then fed to a voltage amplifier 114, which is used to generate a primary drive signal 116 that is applied to the primary drive transducer 72.

A secondary feedback loop is used to determine the rate of rotation applied about an axis perpendicular to the ring 70 of the angular velocity sensor due to Coriolis forces. The secondary feedback loop is arranged between a secondary pick-off transducer 118 and a secondary drive transducer 120 and is arranged to null the Coriolis forces applied to the ring 70. The secondary feedback loop includes a charge amplifier 122 arranged to amplify secondary pick-off signals received from the secondary pick-off transducer 118. An output of the charge amplifier 122 is demodulated by two demodulators 124 and 126.

Demodulator 124 is arranged to demodulate the secondary pick-off signals received from the charge amplifier 122 with the quadrature phase reference signals 86 and to generate an output signal 128, which is fed to a loop filter 130 arranged to maintain the stability of the closed secondary feedback loop between the secondary pick-off transducer 118 and the secondary drive transducer 120. An output signal 132 of the loop filter 130 will provide a measure of the rate of rotation applied to the ring 70 of angular velocity sensor. The output signal 132 is also fed to a modulator 134, which is arranged to modulate the output signal 132 with the in-phase reference signals 84 to produce a modulated output signal 136.

Demodulator 126 is arranged to demodulate the secondary pick-off signal received from the charge amplifier 122 with the in-phase reference signals 84 to generate an output signal 138, which is fed to a loop filter 140. The loop filter 140 is arranged to maintain stable operation of the closed secondary feedback loop between the secondary pick-off transducer 118 and the secondary drive transducer 120. An output signal 142 of the loop filter 140 is fed to a modulator 144, which is arranged to modulate the output signal 142 with the quadrature phase reference signals 86 to generate a modulated output signal 146.

Modulated output signal 136 and modulated output signal 146 are each fed into a summation element 148 arranged to sum the two demodulated output signals 136 and 146 to generate a secondary drive signal 150, which is applied to the secondary drive transducer 120 to null the effect of applied rotational or Coriolis forces.

Figure 6:
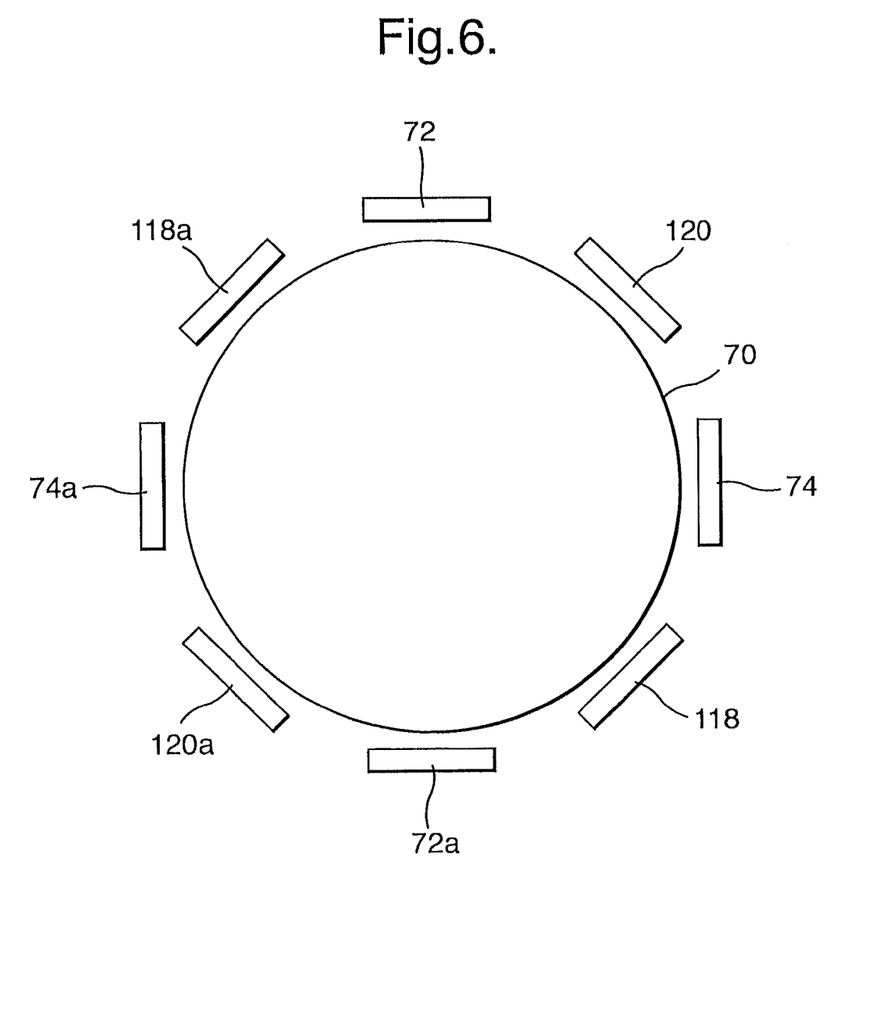
FIG. 6 is a schematic illustration of an alternative arrangement of primary drive and pick-off and secondary drive and pick-off transducers according to the present invention.

FIG. 6, wherein like references have been used to indicate similar integers to those illustrated with reference to FIG. 5, illustrates an alternative arrangement of the primary drive and pick-off transducers and secondary drive and secondary pick-off transducers.

In this arrangement each of the drive and pick-off transducers comprise two portions arranged about a ring 70. Herein, a primary drive transducer 70 is arranged at 180° with respect to a cooperating primary drive transducer 72a. Primary pickoff transducer 74 is arranged at 90° about the ring 70 with respect to the primary drive transducer 72. A cooperating portion of the primary pick-off transducer 74 is arranged at 180° with respect to the primary pick-off transducer 74 as indicated by primary pick-off transducer 74a. Secondary drive transducer 120 is arranged at 45° with respect to the primary drive transducer 72 and has a cooperating portion arranged at 180° with respect to the secondary drive transducer 120 as indicated by secondary drive transducer 120a. Secondary pick-off transducer 118 is arranged at 90° with respect to the secondary drive transducer 120 and has a cooperating secondary pick-off transducer 118a arranged at 180° with respect to the secondary pick-off transducer 118.

It will be understood that the primary and secondary drive transducer 72 and 120 and primary and secondary pick-off transducers 74 and 118 are capacitive type devices. The primary and secondary drive transducers 72 and 120 are arranged to generate a predetermined electrostatic force between the ring 70 and the respective transducer to cause vibration of the ring 70, whereas the primary and secondary pick-off transducers 74 and 118 are arranged to detect changes in the electrostatic force between the ring 70 and the transducer. The ring 70 has a DC bias of typically 50 volts for polarisation. This is the DC bias on the ring 70, which in combination with a smaller AC signal provides a drive force at the AC signal frequency. Without the DC bias there would be a drive force quadratic to the AC signal, at twice the frequency of the ring 70. Likewise, for detection, the presence of the DC bias increases the gain of the AC signal at the primary and secondary pick-off transducers 74 and 118 at the frequency of the ring 70.

Furthermore, although not illustrated, the present invention can include oscillation frequency adjusting transducers in the form of capacitor plates, located either internally or externally of the ring 70 and are each spaced from the ring 70 to create a capacitive gap. Each capacitor plate is arranged to generate a predetermined electrostatic force which acts upon the ring 70 to locally adjust the stiffness of the ring 70. In this manner, when a DC voltage offset is applied between a capacitor plate and the ring 70, an electrostatic force is generated that acts as a negative spring and allows the stiffness of the ring 70 to be locally adjusted. Therefore, the vibration mode frequencies of the ring 70 can be differentially adjusted using the capacitor plates to ensure that the primary and secondary vibration mode frequencies are accurately matched.

The primary pick-off transducer voltage $V_{PO}$ is given by:

$$\hat{V}_{PO} = \frac{1}{C_f} \frac{\varepsilon A V_{HT} \hat{x}}{d^2}$$

The second harmonic of the pick-off transducer voltage is given by:

$$\hat{V}_{PPO}^{2F} = \frac{1}{C_f} \frac{\varepsilon A V_{HT}}{d} \frac{\hat{x}^2}{2d^2}$$

Where x is the amplitude of motion, $C_f$ is the feedback capacitance of a charge amplifier, A is the plate area of the primary pick-off transducer, which acts as a capacitor, and d is the capacitor gap between the primary pick-off transducer and the ring.

The inventor has found that as the scale factor changes the second harmonic of the primary pick-off signal changes in a similar manner. The ratio of the primary pick-off transducer second harmonic $V_{2f}$ over the fundamental frequency $V_{1f}$ is expressed as:

$$\frac{V_{2f}}{V_{1f}} = \frac{\hat{x}}{2d}$$

If the gap d changes due to charge trapping, and if the ratio $V_{2f}/V_{1f}$ is used to control the generation of the primary drive signal, rather than just $V_{1f}$ as in the prior art, the amplitude of motion x changes in proportion to the gap d change. As the scale factor is proportional to the amplitude of motion x this effects a compensation of the scale factor under charge trapping conditions.

The scale factor when a second harmonic frequency over a fundamental frequency ($2f/1f$) ratio is used to generate the primary drive signal is as follows:

$$\frac{\hat{V}_{SD}}{\Omega} = -2k_B m\omega AGC_{(1F2F)} \frac{d^3}{V_{HT}\varepsilon A}$$

$K_B$ is the Bryan constant, set by the geometry of the ring, with a typical value of 0.8 and $\omega$ is the angular frequency of the 28 resonance. Where m is the modal mass of the ring and Q is the applied angular rate. The scale factor is proportional to the inverse of the HT voltage, i.e. $1/V_{HT}$, rather than the inverse square of the HT voltage, i.e. $1/V_{HT}^2$, and the scale factor is also proportional to the third power of the gap d, i.e $d^3$, rather than the fourth power of the gap d, i.e $d^4$. The HT voltage $V_{HT}$ is the effective voltage across the gap d between the transducer and ring, not the measured or applied voltage and is not directly measurable. Hence, it will be noted that there is an attenuation rather than a complete removal of the charge trapping effect if the charge trapping effect changes either the effective HT voltage or the gap d.

Furthermore, the gain of the charge amplifier is removed by use of the $2f/1f$ ratio.

The $2f/1f$ ratio can be implemented in software or by a suitable electronics means, which determines the amplitude of the fundamental frequency and the amplitude of the second harmonic frequency and the ratio of the two amplitudes.

An alternative ratio can be used in the generation of the primary drive signal as follows:

$$\hat{V}_{PO} = \frac{1}{C}\frac{\varepsilon A V_{HT}\hat{x}}{d^2}$$

and $$\hat{V}_{PPO}^{2F} = \frac{1}{C_f}\frac{\varepsilon A V_{HT}}{d}\frac{\hat{x}^2}{2d^2}$$

thus:

$$\frac{V_{ppo}^{2f}}{V_{PO}^2} = \frac{C_f}{2}\frac{d^2}{\varepsilon A V_{HT}}$$

$$\frac{\hat{V}_{SD}}{\Omega} = -\frac{4d}{C_f}K_B m\omega AGC_{1f2f}\frac{V_{ppo}^{2f}}{V_{PO}^2}$$

where $\varepsilon$ is the dielectric constant of free space.

In this case, the scale factor will be only proportional to gap d if the following ratio is held constant for generation of the primary drive signal:

$$\frac{(V_{ppo}^{2f})^2}{V_{PO}^2}$$

This ratio can be implemented in software or by a suitable electronics means, which generates the third power of the amplitude of the fundamental frequency and the second power of the amplitude of the second harmonic frequency and the ratio of the two amplitudes.

For a high performance angular velocity sensor, the primary and secondary control loops are preferably digitally controlled. Thus there are analogue to digital converters (ADC) and digital to analogue converters (DAC) included in the control loops. An ADC is arranged at the output of the charge amplifier from the primary and secondary pick-off transducers and a DAC arranged to feed the primary and secondary drive transducers. A digital signal processor, for example an Analog Devices SHARC (registered trademark) processor, can be used to control the primary control loop and implement the loop filtering for the primary and secondary control loops. It is thus possible to implement the $2f/1f$ ratio or the $2f^2/1f^3$ ratio digitally in the processor.

During start up of the primary control loop, the amplitude of the fundamental frequency ($1f$) signal is zero so the $2f/1f$ ratio will not provide a sensible metric to control the generation of the primary drive signal. Accordingly, the $2f/1f$ ratio is disabled during the start-up process, such that a conventional fundamental frequency ($1f$) signal is applied until the amplitude of motion of the ring reaches a predetermined value, at which point the $2f/1f$ ratio can be calculated and applied in the generation of the primary drive signal. For example, the transition between a conventional fundamental frequency ($1f$) signal and a f/1f ratio can take place in the first 100 milliseconds from initiation of the start-up process such that the transition does not impact on normal operation of the angular rate sensor.

Figure 7:
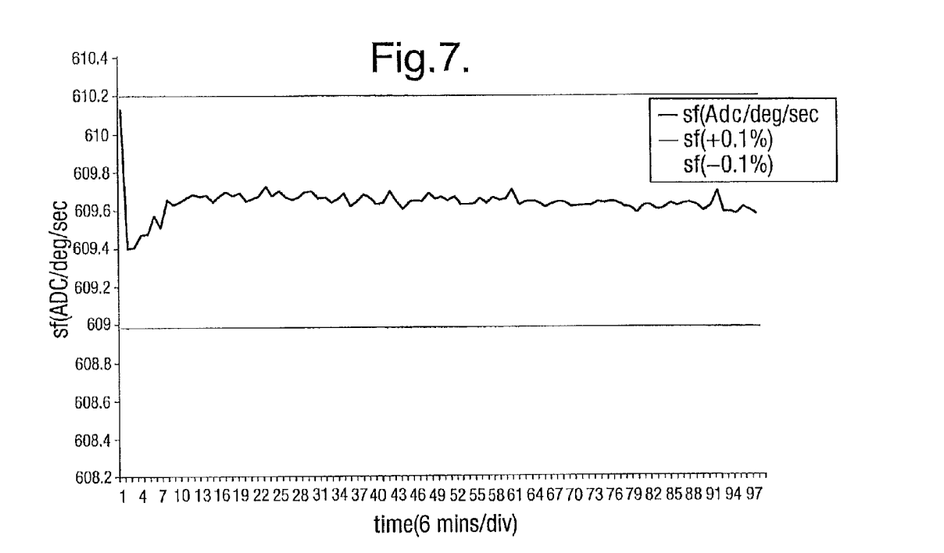
FIG. 7 is a graphical representation of the scale factor response of an angular velocity sensor according to the present invention.
Figure 8:
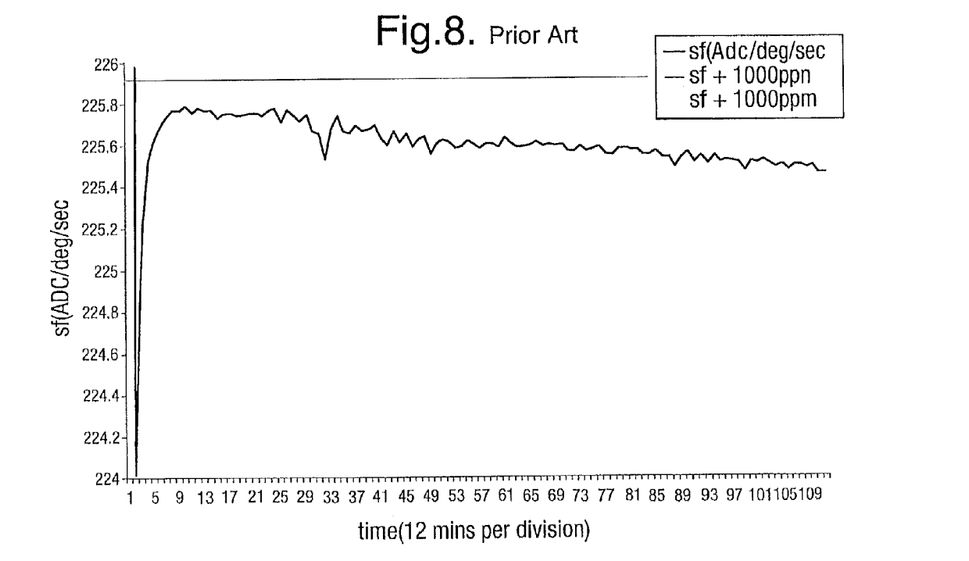
FIG. 8 is a graphical representation of the scale factor response of a gyroscope according to the prior art.

Typical results for scale factor as a function of time are shown in FIG. 7 using a $2f/1f$ ratio scheme to generate the primary drive signals. A period of ten hours, along the abscissa axis, is illustrated and the long term drift of the scale factor, along the ordinate axis, remains stable to within 0.03% over the period after start-up of the device. This is to be compared to a similar experiment using a prior art fundamental frequency ($1f$) scheme shown in FIG. 8. The results illustrated in FIG. 8 were for the same angular velocity sensor device used to produce the results illustrate in FIG. 7, but monitored for a sixteen hour period with a fundamental frequency ($1f$) scheme. However, as illustrated, the scale factor changed by 0.15% during the monitored period after start-up of the device. The results of FIGS. 7 and 8 were recorded whilst the device was soaked at a temperature of 85° C. Furthermore, the device was subjected to a temperature of 150° C. to reset the device, i.e. remove the charge trapping effect, between the experiments that produced the results of FIGS. 7 and 8. Accordingly, the use of the $2f/1f$ ratio rather than the conventional fundamental frequency ($1f$) control to generate the primary drive signal results in a five fold improvement in stability of scale factor of the device over time. Although, FIGS. 7 and 8 illustrate a different scale factor along the ordinate, it will be understood that the scale factor is a result of the amplitude of motion of the ring as set be a user, in this case the scale factor between FIG. 7 and FIG. 8 is a factor of 3 to 1 as different amplitude of motions were set by the user at the beginning of the experiments. However, it is clear that the long term steady state scale factor drift, independent of amplitude of motion of the ring, is improved from that of FIG. 8, which use the conventional fundamental frequency (1ƒ) control, and that of FIG. 7, which use the 2ƒ/1ƒ ratio to control to generate the primary drive signals.

It will be understood that in a digital implemented scheme for the primary control loop it is possible to sample the primary pick-off signal at various sample rates, for example it is possible to produce a four samples per cycle scheme. In a four sample per cycle scheme, samples PPO_1, PPO_2, PPO_3 and PPO_4 are obtained at phase angles 45°, 135°, 225° and 315° using a suitable sample and hold circuit which feeds into an ADC device arranged to produce a digital output signal.

In this case, a first demodulator is arranged to demodulate a sine function of the fundamental frequency from the digital output signal and is given as:

PPO_1+PPO_2−PPO_3−PPO_4 and a second demodulator is arranged to demodulate a cosine function of the fundamental frequency from the digital output signal and is given as:

PPO_1−PPO_2−PPO_3+PPO_4.

These are the two phases required for the in-phase signal, via the first demodulator, and quadrature phase signal, via the second demodulator, primary pick-off signals. The quadrature phase signal generated by the second demodulator is used as an input to a digital frequency loop and the in-phase signal generated by the first demodulator is used as a first input to a digital automatic gain control loop.

Four additional second harmonic frequency samples are also obtained per cycle, samples PPO2ƒ_1, PPO2ƒ_2, PPO2ƒ_3 and PPO2ƒ_4, at phase angles 22.5°, 66.7°, 112.5° and 157.5° using a suitable sample and hold circuit which feeds into am ADC device arranged to produce a digital output signal. A third demodulator is arranged to demodulate a cosine function of the second harmonic frequency signal (2ƒ) from the digital output signal and is given as:

−PPO2f_1+PPO2f_2−PPO2f_3+PPO2f_4.

The second harmonic frequency signal (2ƒ) is used as a second input to the digital automatic gain control loop.

The digital automatic gain control loop includes divide block that implements the generation of the 2ƒ/1ƒ ratio signal by division of the signal (PPO2ƒ) generated by the third demodulator with the signal (PPO) generated by the first demodulator.

An amplitude of motion signal for a primary drive signal is then generated by subtraction of a voltage reference signal from the 2ƒ/1ƒ ratio signal such that the result is the error signal with respect to the required amplitude of motion implemented by the primary drive signal. It will be noted that an increase in the voltage reference signal will increase the amplitude of motion implemented by the primary drive signal.

The amplitude of motion signal is fed to a loop filter which is arranged to compute the loop filter function. The loop filter includes an integrator and normally a phase advance function. The integrator is arranged to set the correct amplitude of motion for the primary drive signal. The primary drive signals comprise output signals PDR_1, PDR_2, PDR_3 and PDR_4 which are arranged to set DAC levels at phases 45°, 135°, 225° and 315° with respect to a 14 kHz nominal ring frequency such that the primary drive signals applied to the primary drive transducer(s) is given as:

PDR_1+PDR_2−PDR_3−PDR_4.

This gives rise to a square wave signal at the resonant frequency of the ring which is set by a voltage controlled oscillator, which in turn sets the reference times for each DAC to operate.

The quadrature phase signal from the second demodulator is fed to a phase lock loop filter to generate a drive signal for the voltage controlled oscillator, which is connected to the loop filter via a DAC. The voltage controlled oscillator is arranged to set the frequency of the frequency loop and operates at 32 times the frequency of the frequency loop, which is nominally 14 kHz. An output of the voltage controlled oscillator is divided down to generate all the phases required for sampling of the primary pick-off signal and to set the primary drive signal.

It will be appreciated that a $2f^2/1f^3$ ratio can also be generated digitally in a similar manner to that described for the 2ƒ/1ƒ ratio.

The invention claimed is:

1. An angular velocity sensor, comprising;
a semiconductor substrate;
a ring structure arranged to vibrate;
a support arranged to support the ring structure relative to the semiconductor substrate;
at least one primary drive transducer arranged to cause the ring structure to oscillate in a primary mode substantially at a resonant frequency of the primary mode;
at least one primary pick-off transducer arranged to detect oscillation of the ring structure in the primary mode;
a primary control loop arranged to receive primary pick-off signals from the at least one primary pick-off transducer and provide primary drive signals to the at least one primary drive transducer to maintain resonant oscillation of the ring structure; and
wherein the primary control loop includes a first means arranged to determine an amplitude of the fundamental frequency of the primary pick-off signals and a second means arranged to determine an amplitude of the second harmonic frequency of the primary pick-off signals and a drive signal generator arranged to produce the primary drive signals with amplitude that is dependent on a ratio of the amplitude of the second harmonic frequency of the primary pick-off signals over the amplitude of the fundamental frequency of the primary pick-off signals.

2. The angular velocity sensor, as claimed in claim 1, wherein the drive signal generator is arranged to produce the primary drive signals with amplitude that is dependent on a ratio of a second power of the amplitude of the second harmonic frequency of the primary pick-off signals over and a third power of the amplitude of the fundamental frequency of the primary pick-off signals.

3. The angular velocity sensor, as claimed in claim 1, including at least one secondary pick-off transducer arranged to detect oscillation of a secondary mode induced when angular velocity is applied around as axis substantially perpendicular to the ring structure.

4. The angular velocity sensor, as claimed in claim 3, including at least one secondary drive transducer in a closed loop with the secondary pick-off transducer and wherein the secondary drive transducer is arranged to null the induced secondary mode oscillation.

5. The angular velocity sensor, as claimed in claim 1, wherein the primary control loop includes a demodulator connected to a voltage controlled oscillator, wherein the demodulator is arranged to produce a demodulated output from the amplitude of the fundamental frequency of the primary pick-off signals with in-phase reference signals and the voltage controlled oscillator is arranged to generate in-phase reference signals, quadrature phase reference signals and second harmonic frequency reference signals from the demodulated output.

6. The angular velocity sensor, as claimed in 5, wherein the first means of the primary control loop includes a demodulator arranged to demodulate the primary pick-off signals with quadrature phase reference signals to produce the amplitude of the fundamental frequency of the primary pick-off signals.

7. The angular velocity sensor, as claimed in claim 5, wherein the second means of the primary control loop includes a demodulator arranged to demodulate the primary pick-off signals with second harmonic frequency reference signals to produce the amplitude of the second harmonic frequency of the primary pick-off signals.

8. The angular velocity sensor, as claimed in claim 5, wherein the drive signal generator includes a modulator connected to a voltage amplifier, wherein the modulator is arranged to produce a modulated output from the ratio of the amplitude of the second harmonic frequency of the primary pick-off signals over the amplitude of the fundamental frequency of the primary pick-off signals with the in-phase reference signals and the voltage amplifier is arranged to amplify the modulated output to produce the primary drive signals.

9. The angular velocity sensor, as claimed in claim 1, wherein the ring structure is a planar structure and the semiconductor substrate, the ring structure and support are substantially co-planar with one another.

10. The angular velocity sensor, as claimed in claim 4, which includes at least one oscillation frequency adjusting transducer and an associated voltage source arranged to apply a voltage between the at the least one oscillation frequency adjusting transducer and the ring structure to generate an electrostatic force between the oscillation frequency adjusting transducer and the ring structure to differentially adjust the frequencies of the primary and secondary modes to reduce the difference between the frequencies of the primary and secondary modes.

11. The angular velocity sensor, as claimed in claim 10, wherein the primary and secondary drive transducers, the primary and secondary pick-off transducers and the at least one oscillation frequency adjusting transducer are substantially co-planar with one another and substantially co-planar with the semiconductor substrate.

12. The angular velocity sensor, as claimed in claim 10, wherein the semiconductor substrate, the ring structure, the support, the primary and secondary drive transducers, the primary and secondary pick-off transducers and the at least one oscillation frequency adjusting transducers are formed from a silicon material.

13. The angular velocity sensor, as claimed in claim 1, wherein the support includes two or more radially compliant legs, each leg being supported at one end from a central hub of the semiconductor substrate located internally of the ring structure and each leg connected at the other end to an internal periphery of the ring structure.

14. The angular velocity sensor, as claimed in claim 1, wherein the support includes two or more radially compliant legs, each leg being supported at one end from the semiconductor substrate externally of the ring structure and each leg connected at the other end to an external periphery of the ring structure.

15. The angular velocity sensor, as claimed in claim 10, wherein the semiconductor substrate is sealed between two support substrates to form a sealed cavity encapsulating the ring structure, the support, the primary and secondary drive transducers, the primary and secondary pick-off transducers and the at least one oscillation frequency adjusting transducer.

16. The angular velocity sensor, as claimed in claim 15, wherein the support, the primary and secondary drive transducers, the primary and secondary pick-off transducers and the at least one oscillation frequency adjusting transducer are each carried by one of the two support substrates.

17. A method of generating primary drive signals for an angular velocity sensor, comprising:
   determining an amplitude of the fundamental frequency of a primary pick-off signal;
   determining an amplitude of the second harmonic frequency of the primary pick-off signal; and
   generating primary drive signals having an amplitude dependent on a ratio of the amplitude of the second harmonic frequency of the primary pick-off signal over the amplitude of the fundamental frequency of the primary pick-off signal.

18. The method of generating primary drive signals for an angular velocity sensor, as claimed in claim 17, comprising:
   generating primary drive signals having an amplitude dependent on a ratio of a second power of the amplitude of the second harmonic frequency of the primary pick-off signal over and a third power of the amplitude of the fundamental frequency of the primary pick-off signal.

19. The angular velocity sensor, as claimed in claim 2, including at least one secondary pick-off transducer arranged to detect oscillation of a secondary mode induced when angular velocity is applied around as axis substantially perpendicular to the ring structure.

20. The angular velocity sensor, as claimed in claim 2, wherein the primary control loop includes a demodulator connected to a voltage controlled oscillator, wherein the demodulator is arranged to produce a demodulated output from the amplitude of the fundamental frequency of the primary pick-off signals with in-phase reference signals and the voltage controlled oscillator is arranged to generate in-phase reference signals, quadrature phase reference signals and second harmonic frequency reference signals from the demodulated output.

* * * * *